United States Patent [19]

Renshaw et al.

[11] Patent Number: 4,523,710
[45] Date of Patent: Jun. 18, 1985

[54] METHOD FOR FABRICATING A FASTENER PLATE

[75] Inventors: Theodore A. Renshaw, North Babylon; Joseph A. Curatolo, Jr., Jackson Heights, both of N.Y.

[73] Assignee: Fairchild Industries, Inc., Chantilly, Va.

[21] Appl. No.: 484,195

[22] Filed: Apr. 12, 1983

[51] Int. Cl.³ .............................................. B23K 20/10
[52] U.S. Cl. ................................... 228/111; 156/73.1; 411/111; 411/119; 411/171; 228/140; 228/161
[58] Field of Search .............. 411/111, 119, 121, 103, 411/171; 228/140, 155, 160, 161, 174; 156/73.1

[56] References Cited

U.S. PATENT DOCUMENTS

| | | | |
|---|---|---|---|
| 2,583,868 | 1/1952 | Mociun | 411/171 X |
| 2,985,954 | 5/1961 | Jones et al. | 228/110 |
| 3,440,117 | 4/1969 | Soloff et al. | 156/73.1 |
| 3,537,499 | 11/1970 | Dey et al. | 411/111 |
| 3,657,802 | 4/1972 | Delmas | 156/73.1 X |
| 3,924,791 | 12/1975 | Shimizu | 228/110 |
| 3,947,307 | 3/1976 | Buchscheidt | 156/73.1 |
| 4,146,165 | 3/1979 | Lesgourgues et al. | 228/161 |

Primary Examiner—Kenneth J. Ramsey
Attorney, Agent, or Firm—Michael W. York

[57] ABSTRACT

A fastener plate is provided for use in securing together structural elements. The plate includes a base plate to which is ultrasonically welded at least one fastening element which may include, for example, an externally-threaded, stud-like fastening element, or an internally-threaded fastening element. A method for fabricating said plate is further described, said method comprising the steps of locating said at least one fastening element on said base plate and then ultrasonically welding said element to said base plate using an ultrasonic welder which includes a center aperture and which is adapted to effect a weld between the annular base portion of the fastening element and the base plate. In an alternative embodiment, at least one locking ring may be used to overlay the annular base portion with the weld being effected between the ring and the base portion.

2 Claims, 13 Drawing Figures

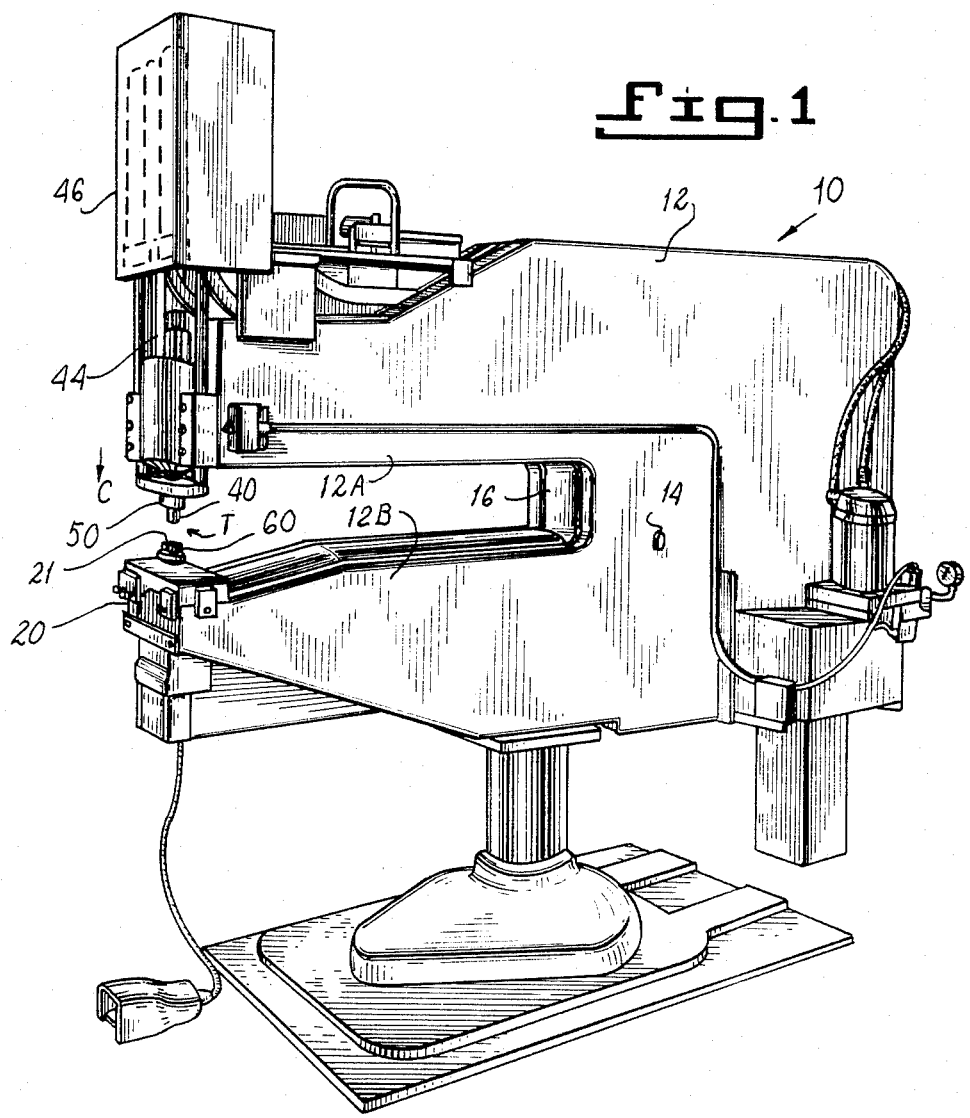
Fig. 1
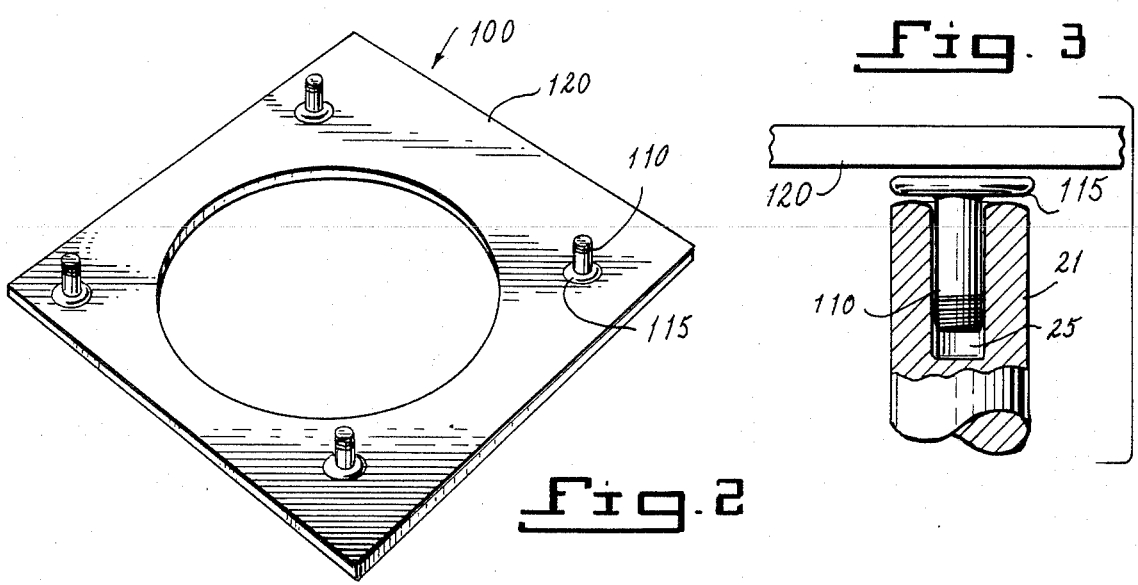
Fig. 2
Fig. 3

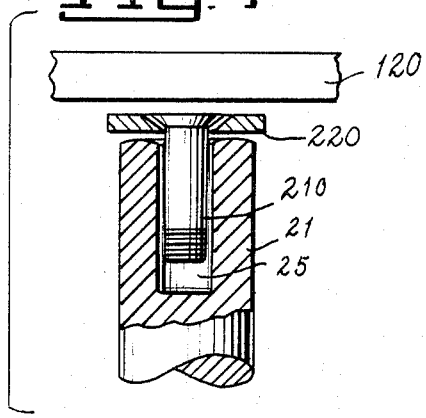
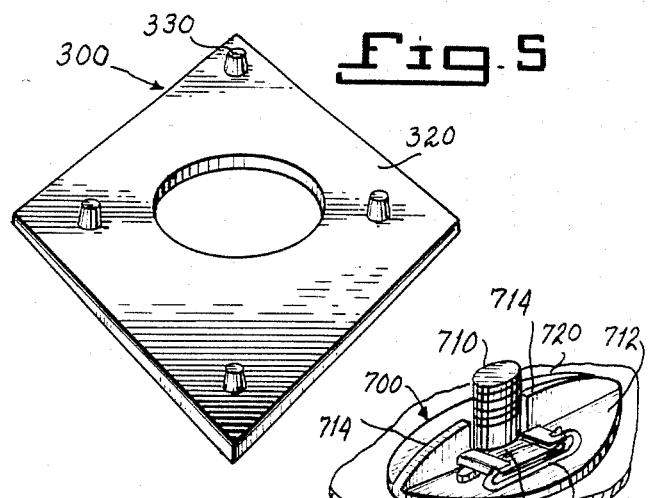
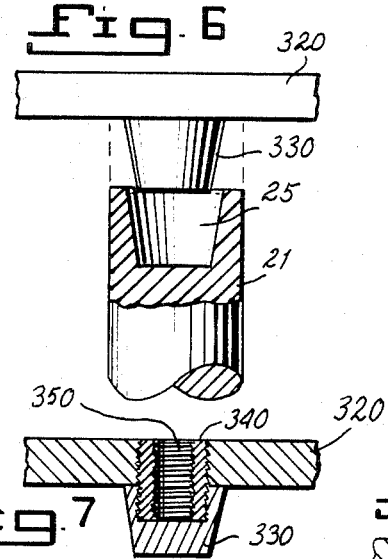
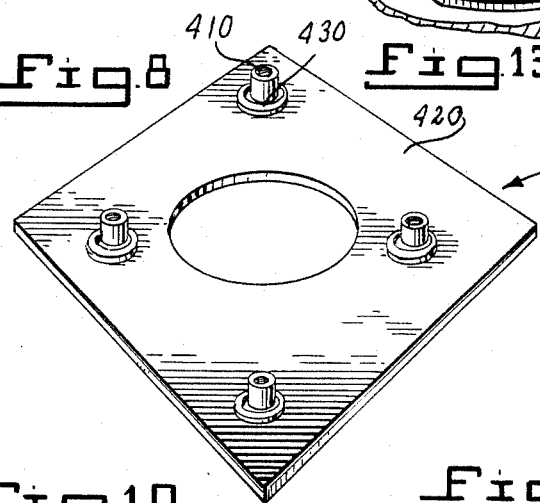
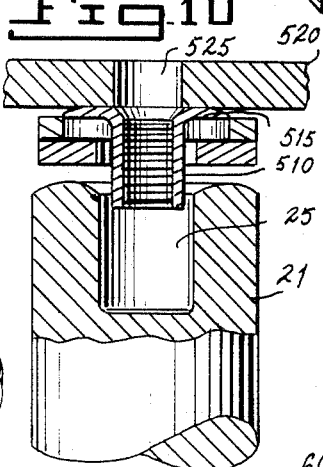
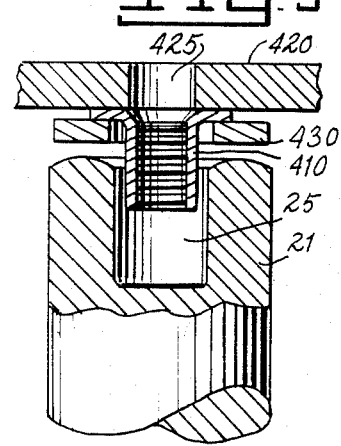
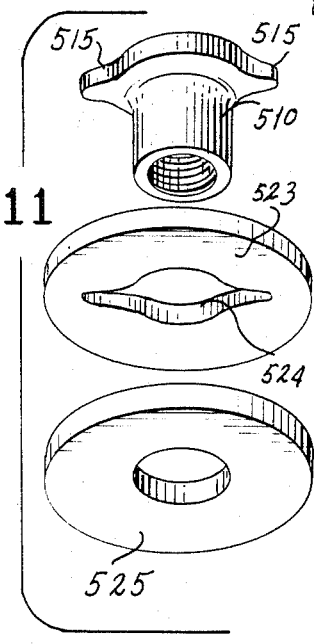
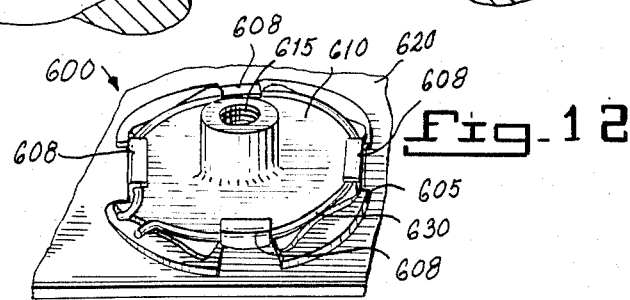

METHOD FOR FABRICATING A FASTENER PLATE

BACKGROUND OF THE INVENTION

The present invention relates generally to fastener plates, i.e., plates containing raised fastening elements such as, for example, nuts, studs, basket-like and other raised fastening elements and a method for attaching said elements to sheet metal to form said fastener plates. More specifically, the present invention relates to such a method wherein ultrasonic vibratory welding apparatus is used to weld these raised fastening elements to sheet metal in order to form an integral fastener plate.

Ultrasonic vibratory spot welding processes for joining together two or more similar or dissimilar materials have been used for a number of years. Until recently, however, such methods were limited to use on thermoplastics, non-woven fabrics and metals where weld strength and integrity were not particularly important. This limitation was due, in large measure, to the problems associated with the ultrasonic welding methods employed, most of which were in prototype stages. In those instances when weld strength and weld integrity were important, i.e., when joining together structural aircraft panels and the like, resistance spot welding procedures were used.

Ultrasonic spot welding procedures have recently demonstrated strong potential for improved sheet metal assembly at reduced cost when compared with resistance spot welding and adhesive bonding techniques. Early studies have indicated that welds effected using prototype ultrasonic welding equipment such as, for example, a Sonobond M-8000 ultrasonic spot welder, were superior to welds produced using conventional resistance spot welding procedures. These early trials indicated that for virtually any material combination, an ultrasonically produced spot weld has an ultimate yield strength of more than 2.5 times that of a weld produced using resistance spot welding equipment. Further tests indicated that ultrasonically produces spot welding can be accomplished with a 75% time and cost savings over conventional adhesive bonding techniques. Until now, however, ultrasonic spot welding for large structural metal parts was not possible in a production environment because of the numerous problems associated with the procedures.

Ultrasonic vibratory welding is a metallurgical joining technique which utilizes high frequency vibrations to disrupt the surface films and oxides and which, therefore, promotes interatomic diffusion and plastic flow between the surfaces in contact without any melting of the materials. Briefly stated, the ultrasonic welding process consists of clamping or otherwise securing together the workpieces under moderate pressure between the welding tip and a support anvil and then introducing high frequency vibratory energy into the pieces for a relatively short period of time, from a fraction of a second to a number of seconds. In many instances, the pieces to be welded are also adhesively bonded together by the insertion of an adhesive bonding agent between the juxtaposed pieces before welding which results in a high strength joint with superior static and fatigue properties.

One example of an ultrasonic spot welder particularly adapted for use on structural metal workpieces is the Sonobond Model M-8000 Ultrasonic Spot Welder marketed by the Sonobond Corporation of West Chester, Pa. This welder includes a transistorized, solid state frequency converter which raises standard 60 Hz electrical line frequency to 15–40 kHz and then amplifies the output. The high frequency electrical power travels through a lightweight cable to a transducer in the welding head where it is converted to vibratory power at the same frequency. The vibratory power is, thereupon, transmitted through an acoustic coupling system to the welding tip and then through the tip into and through the workpieces, with the vibratory energy effecting the weld.

The Sonobond M-8000 Ultrasonic Spot Welder includes a wedge-reed, transducer coupling system which transmits lateral vibrations of a perpendicular reed member attached to it so that the welding tip at the upper end of the reed executes shear vibrations on the surface of the workpieces. The transducer includes piezoelectric ceramic elements encased in a tension shell assembly and operates at a nominal frequency of 15 kHz. A solid state frequency converter with a transistorized hybrid junction amplifier power the welder. The converter operates at a nominal frequency of 15 kHz with a power output variable up to about 4000 RMS RF watts. The welder may be tuned to a precise operating frequency. The frequency converter includes a wide-band RF power measuring circuit which samples output power and detects forward power and load power based on the principle of bi-directional coupling in a transmission line. The signal is processed electronically to provide true RMS values which are selectively displayed on an LED panel meter as either the forward or load power. Forward power is the output of the frequency converter delivered to the transducer in the welding head while load power is the transducer drive power acoustically absorbed by the anvil. The difference between the two readings is the reflected power induced by the load impedance mismatch and is minimized during the welding operation by impedance matching techniques.

It is common practice in the assembly of structural sheet metal assemblies such as, for example, doors, panels and other removable parts, to secure such structural parts together using raised fastening elements such as, for example, screws, studs, nuts and the like. In order to facilitate such assembly operations, "fastening plates", i.e., plates containing raised fastening elements which are riveted, bonded or otherwise secured to a base are used for facilitating assembly. For example, such fastening plates are commonly used in air craft assembly for securing doors or panels to other structural parts. Heretofore, in order to attach such raised fastening elements to a base plate it was necessary to either bolt, rivet or otherwise bond the elements to the base plate. Resistance welding techniques were not readily adaptable for such applications. As can readily be appreciated, such procedures are labor intensive, time consuming, extremely costly and, oftentimes, result in structurally inferior load bearing elements.

It has been found that, due to the inherent characteristics of the ultrasonic vibratory welding equipment it is possible to weld such raised fastening elements to a base plate relatively simply and inexpensively, yet still produce a strong weld between the raised fastening elements and the base plate.

Against the foregoing background of the invention, it is a primary object of the present invention to provide a fastener plate containing raised fastening elements such as, for example, studs, nuts, bolts, baskets and the like, wherein the raised fastening elements are ultrasonically welded to the base plate.

It is another object of the present invention to provide a method for attaching the raised fastening elements to the base plate.

It is yet another object of the present invention to provide such a method which relies on ultrasonic vibratory welding techniques to effect such attachment.

It is still another object of the present invention to provide such a method which is readily adaptable for use in a production environment.

It is yet still another object of the present invention to provide such a method which results in a strong bond between the raised fastening elements and the base plate to permit the resultant fastener plate to be used in load bearing applications.

BRIEF SUMMARY OF THE INVENTION

The present invention, in brief summary, comprises a fastener plate for use in the assembly of structural elements. The fastener plate includes a base plate to which are ultrasonically welded a number of raised fastening elements which include annular base portions such as, for example, nuts, studs, basket-like and other raised elements. A method for fabricating said fastener plate is further described, which comprises the steps of locating the raised fastening elements on the base plate and then ultrasonically welding the elements thereto using ultrasonic welding apparatus which has a welding tip having a center aperture which can accept the raised element and thereby effect a weld between the annular base portions of the raised elements and the base plate. In an alternative embodiment, locking rings may be used to overlay the annular base portions and then weld the ring to the base portion thereby securing the fastening element to the base plate.

BRIEF DESCRIPTION OF THE DRAWINGS

FIG. 1 is a general side perspective view of the ultrasonic welding equipment which may be used in effecting the method of the subject invention;

FIG. 2 is a perspective view of a fastener plate containing a plurality of raised, externally threaded stud fastening elements assembled in accordance with the method of the subject invention;

FIG. 3 is an enlarged view illustrating the manner in which one of the plurality of the raised stud fastening elements are welded to the base plate to form the fastener plate of FIG. 2;

FIG. 4 is an enlarged view illustrating the manner in which one of the plurality of the raised stud fastening elements having a locking ring are welded to the base plate to form a modified version of the fastener plate of FIG. 2;

FIG. 5 is a perspective view of a fastener plate containing a first plurality of internally threaded fastener elements fabricated in accordance with an alternative embodiment of the method of the subject invention;

FIG. 6 is an enlarged view illustrating the initial manufacturing step in fabricating the fastener plate of FIG. 5 in accordance with a first alternative embodiment of the method of the subject invention;

FIG. 7 is an enlarged view illustrating a subsequent manufacturing operation of the method of FIG. 6;

FIG. 8 is a perspective view of a fastener plate containing a plurality of raised, nut-like fastener elements fabricated in accordance with still another embodiment of the present invention;

FIG. 9 is an enlarged view illustrating the manner in which one the plurality of raised nut-like fastener elements is welded to the base plate to form the fastener plate of FIG. 8;

FIG. 10 is an enlarged view illustrating the manner in which one of the plurality of raised nut-like fastener elements and locking rings are welded to the base plate to form a modified version of the plate of FIG. 8;

FIG. 11 is a break away view illustrating the components of the elements of FIG. 10;

FIG. 12 in a perspective view of a fastener plate including still another type of raised, basket-type fastening element welded to a base plate in accordance with the teachings of the subject invention; and FIG. 13 is a perspective view of a fastener plate including still another type of raised, spring retainer clip fastening element welded to a base plate in accordance with the teachings of the subject invention.

DETAILED DESCRIPTION OF THE INVENTION

Ultrasonic spot welder 10 includes a generally C-shaped clamping frame 12 pivotably mounted about pivot 14 and supported on a stationary central welder frame 16. Clamping frame 12 includes elongated upper and lower sections 12A and 12B, respectively, which, in combination with the central welder frame 16, define a throat T into which the workpieces to be welded may be inserted for welding.

A welding head 20, including a welding tip 21, which forms the end of a vibratory reed 22, is provided and is secured to stationary welder frame 16. A slideably mounted anvil 40 is provided on the opposite side of the throat. Collar clamps 50 and 60 are provided about the anvil 40 and the welding tip 21, respectively.

Anvil 40, which is movable toward and away from welding tip 21 along anvil guide 44, is powered by at least one internally contained, hydraulic anvil cylinder 46. Movement of anvil 40 is independent of movement of collar clamp 50. When a workpiece W to be welded (not shown in FIG. 1) is inserted into the throat between the anvil 40 and the welding tip 21, the anvil 40 is lowered in a clamping direction C toward welding tip 21 until, as shown in FIG. 4, the workpieces are clamped together between collar clamps 50 and 60. This clamping action between the clamps 50 and 60 not only serves to clamp the workpieces together but, additionally, causes a compressive force to be applied between them. Spot welding of the workpieces may therefore be accomplished in the manner hereinafter described.

Vibratory reed 22, at its end opposite the welding tip 21, is connected to a transducer 24 as shown in FIG. 2 which is contained within welding frame 16. Transducer 24 transmits lateral vibrations and induces flexural vibration of the reed 22 so that the welding tip 21 at the upper end of the reed 22 may introduce shear vibrations into workpieces. Transducer 24 consists of piezoelectric ceramic elements encased in a tension shell assembly and is operated at a nominal frequency of about 15 kHz.

Spot welder 10, which is a modification of the Sonobond Model M-8000 ultrasonic spot welder, includes a frequency converter which incorporates a wide-band RF power measuring circuit for sampling the output power to detect the forward power and the load power based on the principle of directional coupling in a transmission line. The signal is processed electronically by internal circuitry to provide true RMS values which are displayed as either the forward power or the load power. Forward power is the output of the frequency converter delivered to the transducer in the welding tip 21 while load power is the transducer drive power that is acoustically absorbed in the weld zone. The difference between the forward power and the load power represents the reflected power induced by the load impedance mismatch and is minimized during subsequent welding operations by impedance matching techniques.

Welding tip 21 and anvil 40 are both fabricated from a generally hard metal such as, for example, steel hardened to about $R_c$ 50. The radii of the welding tip 21 may be between about 2" and about 20" and the shape and dimension of anvil 40 generally conforms to that of the welding tip 21.

In a first embodiment of the subject invention shown in FIG. 2, a fastener plate 100 is provided which includes a plurality of raised, externally threaded, stud-like fastening elements 110 each welded to a base plate 120. Such a fastener plate 100 may be used, for example, for securing other structural elements thereto by insertion of some or all of the raised stud-like fastening elements 110 through complimentary apertures contained in a structure to which the plate is to be secured (not shown), and is affixed thereto by the use of nuts or other fastening elements. Heretofore, such a fastening plate 100 was fabricated in a time consuming and costly manner with each of the individual raised stud-like elements 110 being either riveted, screwed or adhesively bonded to the base plate 100.

In accordance with the teachings of the present invention, such a fastener plate 100 may be fabricated in the manner shown in FIG. 3 wherein each of the individual raised, externally threaded stud-like fastening elements 110 are ultrasonically welded to the base plate 120 in such a manner so as to insure a particularly strong weld therebetween. The use of ultrasonic welding techniques permit the operation to be done, however, in a production environment. As shown in FIG. 3, the ultrasonic welding tip 21 of the welder 10 is specially modified to include a center aperture 25 into which the raised stud-like element can be inserted during the welding operation. Modification of the welding tip 21 permits the welder 10 to accommodate these raised fastening elements 110 and effect a strong bond with the base plate 120. Raised fastening element 110 includes an annular base portion 115 about which the annular portion of the welding tip 21 about center aperture 25 is adapted to engage and weld the fastening element 110 to the base plate 120. As can readily be appreciated, such a method eliminates the heretofore, time consuming steps of having to individually screw, rivet or otherwise adhesively bond the fastening elements 110 to the base plate 120. Attachment of fastening elements 110 to a base plate 120 by ultrasonic welding techniques makes possible assembly practices which had, heretofore, been impracticable in sheet metal assembly. The cost of ultrasonically welding such elements 110 using ultrasonic welding techniques is much less than the present practices heretofore described and, in certain instances, can be as much as one fiftieth the cost of present practices for single stud-like element plates.

FIG. 4 illustrates a modified version of the method described in FIG. 3 and is adapted to affix raised studlike fastening elements 210 to a base plate 120 when the elements 210 fail to include an annular base portion of sufficient size to permit direct welding to the base plate 120. In such instances, a compatible, annular locking ring 220 is overlayed the fastening element 210 which include a flared, annular base portion of reduced diameter. According to this method, the welding tip 21 of the welder 10 is positioned over the fastening element 210 and effects a weld between the locking ring 220 and the base plate 120. As the diameter of the center aperture of the locking ring 220 is less than the diameter of the flared, annular base portion of the fastening element 210, welding of the locking ring 220 to the base plate 120 serves to positively secure the fastening element 210 to the base plate 120. This method is useful for those situations where the material of the stud-like element cannot be usefully welded to the base plate and the material of the locking ring can be welded with good properties.

FIG. 5 illustrates the back side of a fastener plate 300 which includes a plurality of threaded inserts (not shown) inserted into a drilled-out portion of a base plate 320 to which has been welded on the back side, using ultrasonic welding techniques, truncated conical sections 330. Such fastener plates 300 can be used, for example, to affix thereto the stud-like fastener plate shown in FIG. 2. The manner in which such fastener plate 300 is fabricated is shown in FIGS. 6 and 7. Truncated conical sections 330 are first ultrasonically welded to the base plate 320 using specially configured welding tip 21 which includes a center aperture 25 so as to permit it to closely fit and overlay the truncated conical sections 330 and, by transmitting ultrasonic vibratory energy into and through said cylindrical sections 330, effect a weld between the truncated conical sections 330 and the base plate 320. Thereupon, as shown in FIG. 6, a center aperture 340 is drilled through the base plate 320 and into the truncated conical section 330 and a threaded female fastener insert 350 is inserted into the aperture 340 and secured therein by a friction fit or using a suitable adhesive.

Still another fastener plate 400 is shown in FIG. 8 and includes a plurality of internally threaded, raised fastening elements 410 ultrasonically welded to a base plate 420. FIG. 9 illustrates the manner in which fastener plate 400 is constructed. The fastening elements 410 are first located over apertures 425 contained in the base plate 400. Apertures 425 may be pre-drilled prior to placement of elements 410 or, alternatively, the elements 410 may be positioned on the base plate 410 with the apertures 425 thereafter being drilled. As shown in FIG. 9, fastening elements 410 are secured to the base plate 420 using at least one locking ring 430 placed over the flared, annular base portion of the fastening element 410. The center aperture 25 of the welding tip 21 is then adapted to overlay the fastening element 410 and ultrasonically weld the locking ring 425 to the base plate 420. It will be appreciated that if the annular base portion of the fastening element 410 is of sufficient width, no locking ring 425 is required and the annular base portion of the fastening element 410 may be ultrasonically welded directly to the base plate 420. This method is useful for those situations where the material of the stud-like element cannot be usefully welded to the base plate and the material of the locking ring can be welded with good properties.

FIGS. 10 and 11 illustrate a somewhat modified version of the method of FIG. 9 wherein a raised, internally threaded fasten element 510 having opposed, anti-rotation base prongs 515 is provided. In a manner similar to that disclosed relative to FIGS. 8 and 9, fastening element 510 is located over an aperture 525 contained in base plate 520. Over the anti-rotation base prongs 515 of the fastening element 510 is first placed a slotted ring 523 having a center aperture 524 generally complimentary to the anti-rotation prongs 515 of fastening element 510. A locking ring 525 is then place over the slotted ring 523. The welding tip 21 with center aperture 25 is then brought down and ultrasonically welds rings 523 and 525 to the base plate 520. Fastening element 510 is secured by rings 523 and 525 and rotation is prevented by engagement of the anti-rotation prongs 515 with the slots of aperture 524.

Still another embodiment of a raised fastener element 600 is shown in FIG. 12. In this embodiment, a basket 605 including a plurality of raised tab portions 608 is ultrasonically welded to a base plate 620. Into basket 605 is located a fastening element 610 which includes a raised, internally threaded center aperture 615 for engaging externally threaded fastening elements (not shown). Fastening element 610 is retained in place by a retainer spring-loaded clip 630 which is adapted to overlay the annular base of the fastening element 610 and lock the fastening element 610 into the basket 605. Any of a variety of basket shapes can be employed in this embodiment so long as the welding tip is reshaped to accomodate prongs or raised elements on the basket.

FIG. 13 illustrates yet another embodiment of the subject invention wherein a fastening nut plate 700 is provided wherein a plurality of nut fastening elements 710 are ultrasonically welded to a base plate 720. Nut elements 710 include a base 712 having a central spine 714 which serves to react push-out and torque loads. Spring retaining clip 716 is provided for securing an internally threaded nut fastening element 718, which is replaceable. This configuration permits it to be ultrasonically welded to the base plate 720 using a welding tip 21 having a groove rather than a center aperture.

Having thus described the invention with particular reference to the preferred forms thereof, it will be obvious that various changes and modifications may be made therein without departing from the spirit and scope of the present invention.

Wherefore, we claim:

1. A method of fabricating a fastener plate having at least one fastening element ultrasonically welded to a base plate, said method comprising the steps of ultrasonically welding to a base plate a cylindrical or truncated conical reinforcement element; forming a aperture through said base plate and a portion of said reinforcing element; and inserting a fastening element into said aperature.

2. The method of claim 1 wherein said fastening element is an internally threaded fastening element.

* * * * *